(12) United States Patent
Hoareau et al.

(10) Patent No.: US 9,796,529 B1
(45) Date of Patent: Oct. 24, 2017

(54) AUTONOMOUS VEHICLE-BASED PACKAGE PICKUP AND TRANSFER

(71) Applicant: International Business Machines Corporation, Armonk, NY (US)

(72) Inventors: Guillaume Hoareau, Montpellier (FR); Johannes J. Liebenberg, Sandton (ZA); John G. Musial, Newburgh, NY (US); Todd R. Whitman, Bethany, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/275,566

(22) Filed: Sep. 26, 2016

(51) Int. Cl.
| | |
|---|---|
| *G06F 7/00* | (2006.01) |
| *B65G 1/137* | (2006.01) |
| *G06Q 10/08* | (2012.01) |
| *B65G 1/04* | (2006.01) |
| *G06Q 50/28* | (2012.01) |

(52) U.S. Cl.
CPC ......... *B65G 1/1373* (2013.01); *B65G 1/0492* (2013.01); *G06Q 10/08* (2013.01); *G06Q 50/28* (2013.01)

(58) Field of Classification Search
USPC ....................................................... 700/216
See application file for complete search history.

(56) References Cited

U.S. PATENT DOCUMENTS

| | | |
|---|---|---|
| 7,402,018 B2 | 7/2008 | Mountz et al. |
| 9,244,147 B1 | 1/2016 | Soundararajan et al. |
| 9,260,244 B1 | 2/2016 | Cohn |
| 9,487,357 B1 * | 11/2016 | Miele ................... B65G 1/1373 |
| 2006/0251498 A1 * | 11/2006 | Buzzoni ............... B65G 63/004 414/139.9 |
| 2015/0032252 A1 * | 1/2015 | Galluzzo .................. B25J 5/007 700/218 |

(Continued)

FOREIGN PATENT DOCUMENTS

WO     2008085547 A2     7/2008

OTHER PUBLICATIONS

DHL Trend Research, "DHL Report: Unmanned Aerial Vehicle in Logistics", 2014, 24 pages.

*Primary Examiner* — Kyle Logan
(74) *Attorney, Agent, or Firm* — Cantor Colburn LLP; John Pivnichny

(57) ABSTRACT

According to an aspect, an autonomous loading and transfer pad includes a frame having driver assembly configured to transport the frame. The frame includes a surface configured to receive a container. A communications interface is communicatively coupled to the autonomous loading and transfer pad. The autonomous loading and transfer pad also includes an order control system communicatively coupled to the communications interface. The order control system is configured to direct movement of the autonomous loading and transfer pad, via the communications interface, to a pickup point in a storage facility. The autonomous loading and transfer pad receives an item at the pickup point, directs movement of the autonomous loading and transfer pad, via the communications interface, to a transfer point external to the storage facility, and directs an autonomous pick-up and delivery vehicle, via the communications interface, to the transfer point.

17 Claims, 6 Drawing Sheets

(56) References Cited

U.S. PATENT DOCUMENTS

2015/0154557 A1* 6/2015 Skaaksrud ............ H04W 12/06
                                                          705/337
2015/0158599 A1   6/2015 Sisko
2016/0090248 A1   3/2016 Worsley et al.

* cited by examiner

600

ORDER CONTROL SYSTEM PROVIDES AUTONOMOUS LOADING AND TRANSFER PAD WITH ITEM INFORMATION CORRESPONDING TO AN ORDER AND ROUTING INSTRUCTIONS 602

↓

AUTONOMOUS LOADING AND TRANSFER PAD IS ROUTED TO A DESIGNATED PICKUP POINT IN A STORAGE FACILITY ACCORDING TO THE INSTRUCTIONS 604

↓

UPON RECEIPT OF ITEM AT DESIGNATED PICKUP POINT, AUTONOMOUS LOADING AND TRANSFER PAD IS ROUTED TO A DESIGNATED TRANSFER POINT EXTERNAL TO THE STORAGE FACILITY ACCORDING TO THE INSTRUCTIONS 606

↓

ORDER CONTROL SYSTEM TRANSMITS ITEM PICKUP INSTRUCTIONS TO AUTONOMOUS DELIVERY VEHICLE 608

FIG. 6

AUTONOMOUS VEHICLE-BASED PACKAGE PICKUP AND TRANSFER

BACKGROUND

The present disclosure relates generally to package transport, and more specifically, to package loading and transfer by autonomous vehicles.

As more and more consumers are opting for online transactions and purchases, storage warehouses and order fulfillment centers have seen a dramatic increase in activity. In order to be competitive, businesses continuously seek new and cost-effective solutions for handling high volume order generation and fulfillment.

SUMMARY

Embodiments include a system, method, and computer program product for package transport services. The system includes an autonomous loading and transfer pad. The pad includes a frame having a driver assembly configured to transport the frame. The frame includes a surface configured to receive a container. The autonomous loading and transfer pad also includes a communications interface communicatively coupled to the autonomous loading and transfer pad, and an order control system communicatively coupled to the communications interface. The order control system is configured to direct movement of the autonomous loading and transfer pad, via the communications interface, to a pickup point in a storage facility. The autonomous loading and transfer pad receives an item at the pickup point, directs movement of the autonomous loading and transfer pad, via the communications interface, to a transfer point external to the storage facility, and directs an autonomous pick-up and delivery vehicle, via the communications interface, to the transfer point.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 6 depicts a flow diagram of a process for implementing package transport operations in accordance with an embodiment.

DETAILED DESCRIPTION

Embodiments described herein can be utilized for vehicle-implemented package transport services that are utilized in a warehouse or other storage facility. The storage facility includes an internal area that stores items, such as goods subject to purchase, as well as an external area in which selected goods are temporarily placed while awaiting pickup by a transport vehicle.

The package transport services manage the fulfillment of an order from order generation to package drop off operations. The services create an order packing plan and routing plan to direct and guide an autonomous vehicle through a storage facility, deposit items from the order into a container according to the packing plan, and route the autonomous vehicle and container to a designated drop off point that is external to the storage facility. The external drop off point may be a rooftop (e.g., a roof of the storage facility) or a ground-based location, such as a parking lot. The drop off area may be logically divided into bays, each of which is assigned an identifier that is used to determine the location of the particular drop off point. The order, in turn, contains the identifier, which is accessed by the autonomous vehicle to determine the drop off point.

The services further provide instructions to an autonomous delivery vehicle to pick up the contents of the container, which is referred to herein as a "package," at the external drop off point. Depending on the drop off location, the autonomous delivery vehicle may be an autonomous aerial vehicle, an autonomous or human-operated and driven land vehicle.

It will be understood that the package transport services may also be applied to package pickup/return operations (e.g., those in which the autonomous delivery vehicle returns a package to a drop off point external to the storage facility, and the transport services coordinate with the autonomous delivery vehicle to pick up the package at the drop off point by an autonomous vehicle that has been assigned to the package, and return the items in the package to their original, or other designated, storage location within the facility. These and other features of the package transport services will now be described.

Figure 1:
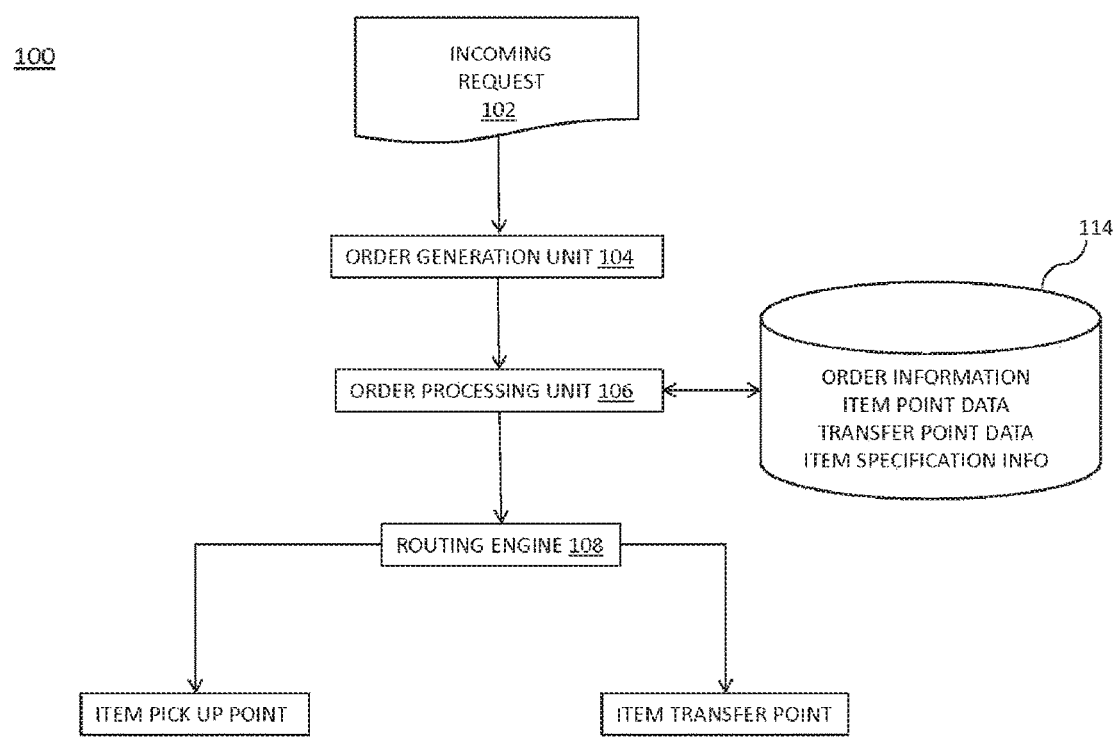
FIG. 1 depicts a high level view of a component architecture for performing package transport services in accordance with an embodiment.

Referring now to FIG. 1, a high level view of a component architecture 100 for performing package transport services for a storage facility in accordance with an embodiment will now be described. The architecture 100 includes an order generation unit 104, an order processing unit 106, a routing engine 108 and a storage device 114. Each of the order generation unit 104, order processing unit 106, and routing engine 108 may be implemented in hardware, software, or a combination thereof. In an embodiment, a portion of the components 104, 106, 108, and 114 may be implemented by an onboard system of an autonomous vehicle while another portion of the components 104, 106, 108, and 114 may be implemented by a centralized computer system that performs additional operational and supervisory functions over the activities conducted at the warehouse. In the non-limiting embodiments described herein, at least a portion of the functionality of the order processing unit 106 and the routing engine 108 are performed by the autonomous vehicle, and the autonomous vehicle is communicatively coupled to the centralized computer system. In addition, the centralized computer system performs the order generation unit 104.

The storage device 114 stores order information, item location data, transfer location data, and item specification information. The specification information may include product item dimensions, weight, materials, and an identifier. In an embodiment, an incoming request 102 is received, an order for the request 102 is generated via the order generation unit 104, and the order is assigned to one of a plurality of autonomous vehicles at the storage facility. The autonomous vehicle, in turn, processes the order via the order processing unit 106, in conjunction with information stored in the storage device 114, and subsequently follows a routing plan that is generated by the routing engine 108. The routing plan includes instructions for transiting the storage facility to an item pick up point and transiting to a transfer point that is external to the storage facility. The transfer point, also referred to as drop off point, provides a temporary location in which the item may be picked up by an autonomous delivery vehicle for movement to its final destination. In one embodiment, the autonomous delivery vehicle may be under the control of, and operated by, a consumer associated with the order. In an alternative embodiment, the autonomous delivery vehicle may be operated by a commercial transport or delivery service provider entity of the storage facility.

Figure 2:
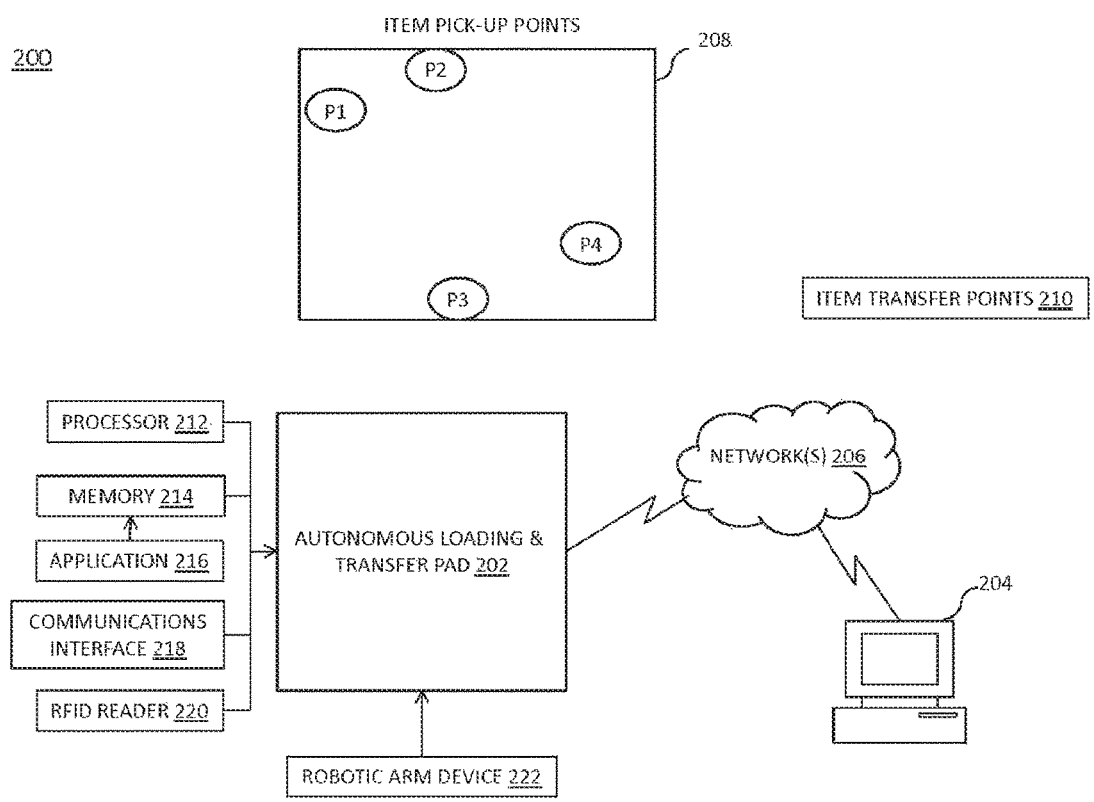
FIG. 2 depicts a block diagram of a system upon which package transport services may be implemented in accordance with an embodiment.

Referring now to FIG. 2, a high level view of a system 200 for performing package transport services is generally shown in accordance with an embodiment. The system 200 includes an autonomous vehicle 202, a centralized computer system 204, pickup points 208, and item transfer points 210. The autonomous vehicle 202 and the centralized computer system 204 are communicatively coupled to one or more networks 206. The autonomous vehicle 202 includes physical components and related circuitry configured to pick up, carry, and drop off packages. As shown in FIG. 2, the autonomous vehicle 202 includes a processor 212, memory 214, an application 216 stored in the memory 214, and a communications interface 218. The application 216 includes the order processing unit 106 of FIG. 1 and may also include the routing engine 108 of FIG. 1.

In an embodiment, the autonomous vehicle 202 may also include a scanner 220, such as a radio frequency identification device (RFID). Optionally, the autonomous vehicle 202 may include a robotic arm device 222 that is integrated with the autonomous vehicle 202. The physical characteristics of the autonomous vehicle 202 are described further in FIG. 3.

The networks 206 may be any type of known networks including, but not limited to, a wide area network (WAN), a local area network (LAN), a global network (e.g. Internet), a virtual private network (VPN), and an intranet. The networks 206 may be implemented using wireless networks or any kind of physical network implementation known in the art, e.g., using cellular, satellite, and/or terrestrial network technologies. The networks 206 may also include short range wireless networks utilizing, e.g., BLUETOOTH™ and WI-FI™ technologies and protocols. In one embodiment, the autonomous vehicles 202 communicate with one another over a short-range wireless network, while the autonomous vehicles 202 communicate with other network entities, such as an autonomous delivery vehicle, over a long-range network (e.g., satellite or cellular).

The centralized computer system 204 may be implemented as one or more high-speed computer processing devices, such as one or more mainframe computers capable of handling a high volume of activities conducted on behalf of end users of the package transport services. The centralized computer system 204 implements one or more of the components of FIG. 1 to facilitate the package transport services described herein. In one embodiment, the centralized computer system 204 implements the order generation unit 104 and communicates generated orders to corresponding autonomous vehicles. The centralized computer system 204 includes memory (e.g., hard disk drive) to store at least a portion of the data of the storage device 114 described in FIG. 1. In an embodiment, a portion of the data of the storage device 114 may be stored in the memory 214 of the autonomous vehicle 202.

In one embodiment, the centralized computer system 204 may be implemented by an entity that sells goods to consumers. Alternatively, the centralized computer system 204 may be implemented by a third-party service provider that provides the package transport services as an intermediary between the seller entity and the consumers.

Figure 3:
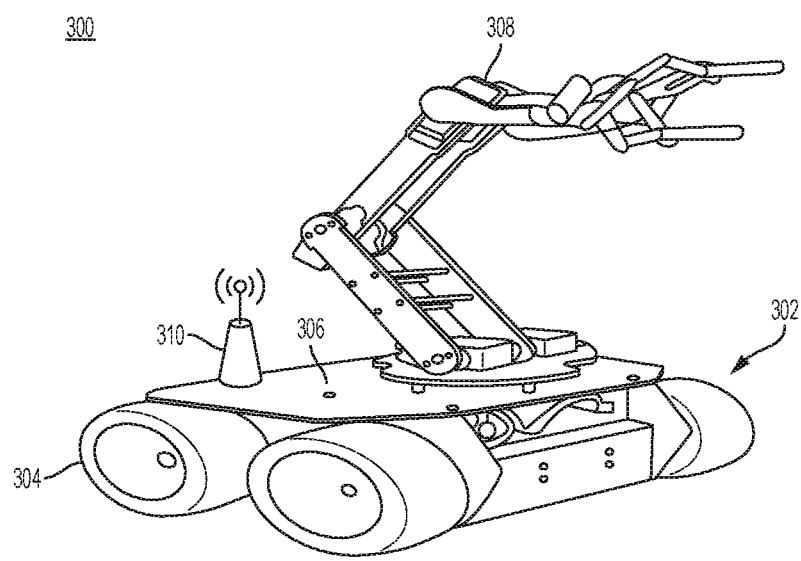
FIG. 3 depicts an autonomous vehicle in accordance with an embodiment.

FIG. 3 depicts an autonomous vehicle 300 in accordance with an embodiment. The autonomous vehicle 300 corresponds to the autonomous vehicle 202 of FIG. 2 and includes the associated components described in FIG. 2.

The autonomous vehicle 300 includes a frame 302, which in turn includes a driver assembly configured to transport the frame 302. The driver assembly may include wheels 304, and a motor or other drive control mechanism. The frame 302 includes a surface 306 on an upper portion of the frame 302. The surface 306 is substantially flat or level in order to receive and transport a container. In an embodiment, the surface 306 may be supported by one or more walls (not shown) to stabilize or secure the container during transport. It will be understood by one of ordinary skill in the art that other frame configurations may be employed, e.g., a bowl-shaped frame or frame having a recessed area configured to secure items during transport.

As shown in FIG. 3, a robotic arm 308 is integrated with the autonomous vehicle 300. The robotic arm 308 corresponds to the arm 222 of FIG. 2. In an embodiment, one end of the robotic arm 308 is attached to the frame 302 and an opposing end includes a mechanical claw or "grabber" configured to grasp items in the storage facility for selection and placement into the container (not shown).

The autonomous vehicle 300 also includes a communications interface 310, which corresponds to the interface 218 of FIG. 2. The communications interface 310 may include one or more antennae configured to receive and send communications over the networks 206. In an embodiment, the communications interface 310 includes a GPS device and interprets the communications received as coordinates throughout the storage facility, as well as external to the storage facility, to facilitate the transport operations described herein.

In an embodiment, the scanner 220 of FIG. 2 may be integrated with the robotic arm 308 (not shown) of FIG. 3.

Figure 4A:
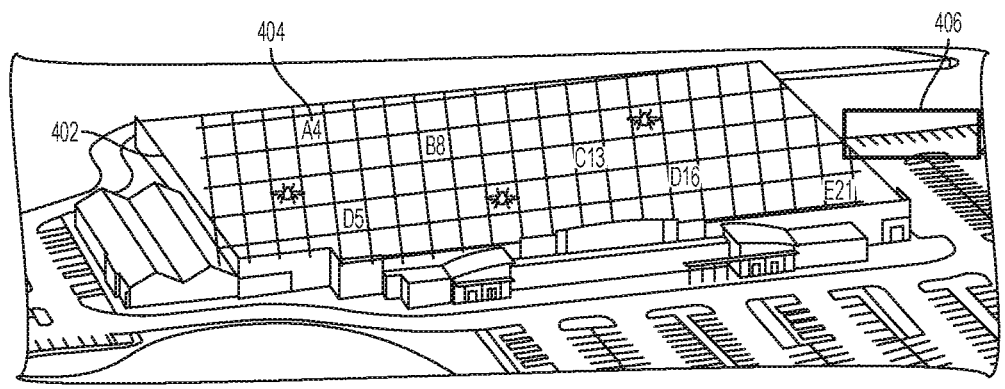
FIG. 4A depicts a transfer point in accordance with an embodiment.
Figure 4B:
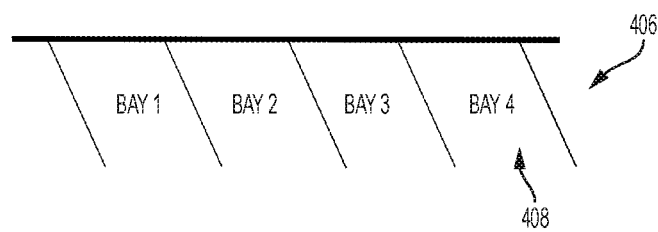
FIG. 4B depicts a transfer point according to another embodiment.

FIG. 4A depicts a roof-top transfer location in accordance with an embodiment, and FIG. 4B depicts a land-based transfer location according to an embodiment. As shown in FIG. 4A, a roof top 402 is logically divided into a plurality of bays 404, each of which is assigned a unique identifier. The bays 404 provide the drop off points for packages transported by the autonomous vehicles. In an embodiment, the storage facility includes a ramp (not shown) disposed between internal, lower level storage locations and the roof-top location. Also shown in FIG. 4A is a portion of a land-based drop off location 406, which in the embodiment shown, is a parking lot external to the storage facility. In FIG. 4B, an enlarged depiction of the land-based drop off location is shown at 406. The land-based drop off location 406 includes bays, each of which include an assigned unique identifier. For example, bay 408 is assigned the identifier "BAY 4." In an embodiment, the storage device 114 stores data associated with the logical division of the roof top 402 drop off points, as well as land-based drop off points, and communicates corresponding transfer location data to an automated vehicle with respect to a package transport operation.

Figure 5A:
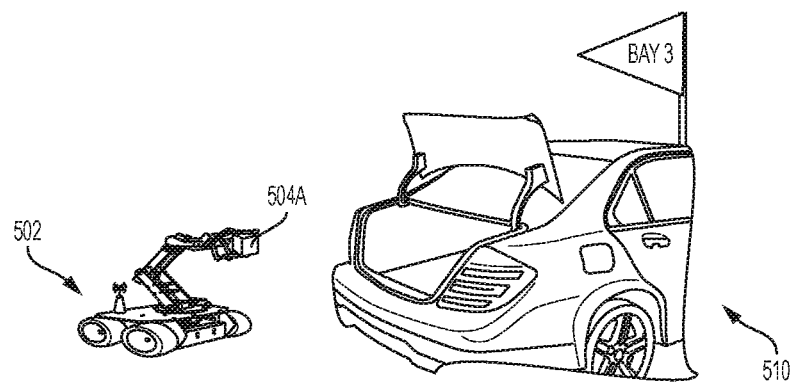
FIG. 5A depicts a first mode of package transfer via the transfer point of FIG. 4B in accordance with an embodiment.

FIG. 5A depicts a first mode of package transfer via the transfer location of FIG. 4B in accordance with an embodiment. As shown in FIG. 5A, a land-based vehicle 510 enters an assigned bay (BAY 3) and an autonomous loading and transfer vehicle 502 transits through the drop off location (e.g., 406) to the vehicle 510 and deposits a package 504A in or near the vehicle 510. In an embodiment, the transfer location data, in conjunction with GPS coordinate data corresponding to the transfer location that is acquired by the autonomous vehicle, can be used to execute and complete a drop off operation.

Figure 5B:
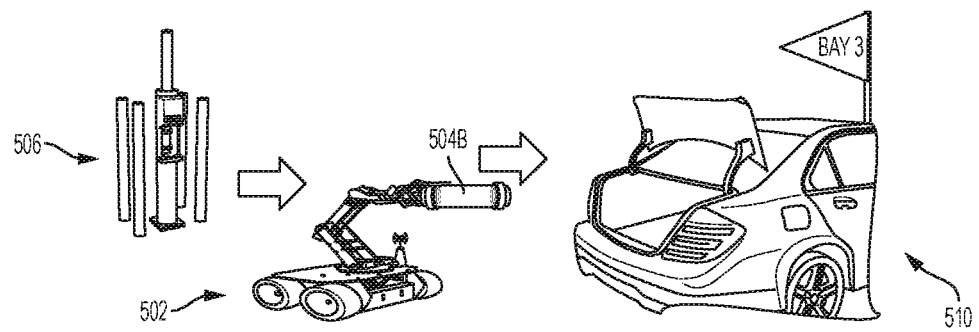
FIG. 5B depicts a second mode of package transfer via the transfer point of FIG. 4B in accordance with an embodiment.

FIG. 5B depicts a second mode of package transfer via the transfer location of FIG. 4B in accordance with an embodiment. As shown in FIG. 5B, the land-based vehicle 510 enters the assigned bay (BAY 3) and the autonomous loading and transfer vehicle 502 receives a container 504B from an automated transport system 506. The automated transport system 506 may be implemented using pneumatic tubes. The container 504B contains the package and deposited in the vehicle 510 by the autonomous vehicle 502.

FIG. 6 depicts a flow diagram of a process for implementing package transport operations in accordance with an embodiment. The processes of FIG. 6 assume that a request 102 (FIG. 1) has been received and an order has been generated from the request. At block 602, routing instructions are transmitted, via an order control system, to an autonomous vehicle. The autonomous vehicle is routed to a designated pick up point in the storage facility according to corresponding routing instructions at block 604. In an embodiment, the routing instructions may coincide with a particular container packing plan that seeks to optimize placement of items in the container. This can be implemented, e.g., using combinatorial optimization and heuristics. Factors that may be accounted for in the packing plan include item dimensions, weight, materials (e.g., items designated as fragile or items containing materials that are incompatible with other materials of other items subject to the order). This information can be derived from the items' specifications stored in the storage device 114. Thus, in one embodiment, the routing plan is configured to ensure a balanced, distributed weight of the container. Other parameters may include the current storage locations of the items within the storage facility. A routing plan is generated to minimize the distance traveled between item pickups and the drop off location. Further, the item specification information can be used to calculate a container size that is suitable for transporting the items through the storage facility.

In an embodiment, the autonomous vehicle may be configured to utilize the scanner at the location in which an item is to be collected, whereby the robotic arm aligns the scanner with respect to the item to scan a tag on the item in order to identify and validate that the item to be collected matches the item identification information in the order. This ensures that the correct item is placed in the container in the event, e.g., an item has been displaced from its intended storage location.

In block 606, upon receipt of the order items by the autonomous vehicle, the pad is routed to a transfer point that is external to the storage facility according to the routing instructions. The transfer point may be a roof-top location or a land-based location.

In block 608, the order control system transmits item pick up instructions to an autonomous delivery vehicle. The delivery vehicle may be an autonomous aerial or land-based vehicle, or may be a human-operated vehicle. In an embodiment, the order control system authenticates the autonomous delivery vehicle prior to hand off of the package to the autonomous delivery vehicle.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
    an autonomous vehicle, comprising:
        a frame having driver assembly configured to transport the frame, the frame including a surface configured to receive a container; and
        a communications interface communicatively coupled to the autonomous vehicle; and
    an order control system communicatively coupled to the communications interface, the order control system configured for:
        directing movement of the autonomous vehicle, via the communications interface, to a pickup point in a storage facility, the autonomous vehicle configured to receive an item at the pickup point, the item received in the container;
        directing movement of the autonomous vehicle, via the communications interface, to a transfer point external to the storage facility, and
        directing an autonomous pick-up and delivery vehicle, via the communications interface, to the transfer point,
    wherein the item is one of a plurality of items subject to an order, the system further comprises a memory storing specifications of the plurality of items, and the order control system is further configured for:
    retrieving the specifications for the plurality of items from the memory;
    determining a container size for receiving the plurality of items based on the specifications of the plurality of items; and
    calculating a routing plan for the autonomous vehicle in the storage facility as a function of the specifications of the plurality of items and the pickup points of the plurality of items within the storage facility, the routing plan calculated to receive the plurality of items in an order that balances distribution of weight of the plurality of items within the container.

2. The system of claim 1, wherein the autonomous vehicle further comprises a robotic arm configured for:
retrieving the item from the pickup point and placing the item in the container; and
removing the item from the container and placing the item at the transfer point.

3. The system of claim 1, wherein the order control system is configured to authenticate the autonomous pick-up and delivery vehicle prior to hand off of the item to the autonomous pick-up and delivery vehicle.

4. The system of claim 1, wherein the transfer point external to the storage facility comprises at least one of a roof top location and a ground level location, the transfer point is logically divided into individual bays for item transfer, wherein the roof top location receives autonomous aerial vehicles as the autonomous pick-up and delivery vehicles, and the ground level location receives autonomous land vehicles as the autonomous pick-up and delivery vehicles.

5. The system of claim 1, further comprising a memory configured to store an order for the item and corresponding item identification information, wherein the autonomous vehicle further comprises a scanning device configured to scan information on the item, and the order control system is configured to compare the scanned information to item identification information in the order stored in the memory, the comparing operative to validate a corresponding item subject to pick up by the autonomous vehicle matches the item listed in the order.

6. The system of claim 5, wherein the memory is further configured to store an identifier of the pickup point of the item in the storage facility, and an identifier of the transfer point external to the storage facility.

7. The system of claim 6, wherein the communications interface includes a global positioning system device communicatively coupled to the order control system, the global positioning system device guiding the autonomous vehicle to the pickup point of the item in the storage facility via the identifier of the pickup point and the identifier of the transfer point external to the storage facility.

8. A method, comprising:
transmitting, via an order control system, routing instructions to an autonomous vehicle, the routing instructions guiding movement of the autonomous vehicle to a pickup point in a storage facility;
receiving, by the autonomous vehicle, an item from the pickup point;
wherein the routing instructions further guide movement of the autonomous vehicle to a transfer point external to the storage facility; and
transmitting item pickup instructions to an autonomous pick-up and delivery vehicle,
wherein the item is one of a plurality of items subject to an order, method further comprising:
determining a container size for receiving the plurality of items based on specifications of the plurality of items; and
calculating a routing plan for the autonomous vehicle in the storage facility as a function of the specifications of the plurality of items and the pickup locations of the plurality of items within the storage facility, the routing plan calculated to receive the plurality of items in an order that balances distribution of weight of the plurality of items within the container.

9. The method of claim 8, further comprising:
retrieving, via a robotic arm of the autonomous vehicle, the item from the pickup location and placing the item in the container; and
removing, via the robotic arm, the item from the container and placing the item at the transfer location.

10. The method of claim 8, further comprising:
scanning information on the item via a scanning device of the autonomous vehicle; and
comparing the information scanned to item information stored by the order control system, the comparing operative to validate a corresponding item subject to pick up by the autonomous vehicle matches the item information stored by the order control system.

11. The method of claim 8, wherein the item is subject to an order, the method further comprising storing the specifications of the item, the pickup location of the item in the storage facility, and the transfer location external to the storage facility.

12. The method of claim 11, further comprising:
guiding, via a global positioning system device communicatively coupled to the order control system, the autonomous vehicle to the pickup location of the item in the storage facility and the transfer location external to the storage facility.

13. The method of claim 8, further comprising:
authenticating the autonomous delivery vehicle prior to hand off of the item to the autonomous pick-up and delivery vehicle.

14. A computer program product comprising a computer readable storage medium having program instructions embodied therewith, wherein the computer readable storage medium is not a transitory signal per se, the program instructions executable by a computer processor to cause the computer processor to perform a method, comprising:
transmitting routing instructions to an autonomous vehicle, the routing instructions guiding movement of the autonomous vehicle to a pickup location in a storage facility;
receiving, by the autonomous vehicle, an item from the pickup location;
wherein the routing instructions further guide movement of the autonomous vehicle to a transfer location external to the storage facility; and
transmitting item pickup instructions to an autonomous delivery vehicle,
wherein the item is one of a plurality of items subject to an order, wherein the program instructions executable by a computer processor further cause the computer processor to perform:
determining a container size for receiving the plurality of items based on specifications of the plurality of items; and
calculating a routing plan for the autonomous vehicle in the storage facility as a function of the specifications of the plurality of items and the pickup locations of the plurality of items within the storage facility, the routing plan calculated to receive the plurality of items in an order that balances distribution of weight of the plurality of items within the container.

15. The computer program product of claim 14, wherein the program instructions executable by a computer processor further cause the computer processor to perform:
scanning information on the item via a scanning device of the autonomous vehicle;
comparing the information scanned to item information stored by an order control system, the comparing operative to validate a corresponding item subject to pick up by the autonomous vehicle matches the item information stored by the order control system.

16. The computer program product of claim 14, wherein the item is subject to an order, wherein the program instructions executable by a computer processor further cause the computer processor to perform storing the specifications of the item, the pickup location of the item in the storage facility, and the transfer location external to the storage facility.

17. The computer program product of claim 16, wherein the program instructions executable by a computer processor further cause the computer processor to perform:
  guiding, via a global positioning system device communicatively coupled to the order control system, the autonomous vehicle to the pickup location of the item in the storage facility and the transfer location external to the storage facility.

* * * * *